United States Patent
Sahebekhtiari et al.

(10) Patent No.: US 8,699,872 B1
(45) Date of Patent: Apr. 15, 2014

(54) OPTICAL COMMUNICATIONS SYSTEM HAVING REDUNDANT ELECTRONIC MODULES FOR OPTICAL TRANSCEIVER

(75) Inventors: Vahid Sahebekhtiari, Huntsville, AL (US); Leif J. Sandstrom, Madison, AL (US)

(73) Assignee: Adtran, Inc., Huntsville, AL (US)

( * ) Notice: Subject to any disclaimer, the term of this patent is extended or adjusted under 35 U.S.C. 154(b) by 284 days.

(21) Appl. No.: 13/043,912

(22) Filed: Mar. 9, 2011
(Under 37 CFR 1.47)

(51) Int. Cl.
*G02F 1/00* (2006.01)

(52) U.S. Cl.
USPC ............. 398/2; 398/3; 398/4; 398/5; 398/71; 398/72; 398/100; 398/33; 398/45; 398/50; 398/46; 398/22; 398/23; 398/24; 398/17; 370/352; 370/392; 370/389; 370/216; 370/218; 370/228

(58) Field of Classification Search
USPC ......... 398/1, 2, 3, 4, 5, 6, 7, 8, 33, 38, 17, 22, 398/23, 24, 45, 48, 66, 67, 68, 70, 71, 72, 398/98, 99, 100, 50, 46; 370/216, 218, 228, 370/465, 468, 464, 1, 2, 3, 4, 5, 6, 7, 8, 33, 370/38, 17, 22, 23, 24, 45, 48, 66, 67, 68, 370/70, 71, 72, 98, 99, 100, 50, 46
See application file for complete search history.

(56) References Cited

U.S. PATENT DOCUMENTS

| | | | |
|---|---|---|---|
| 6,915,075 B1 * | 7/2005 | Oberg et al. | 398/9 |
| 8,019,220 B2 | 9/2011 | Ozaki | |
| 2004/0033077 A1 | 2/2004 | Kim et al. | 398/72 |
| 2005/0175344 A1 | 8/2005 | Huang et al. | 398/79 |
| 2007/0058973 A1 * | 3/2007 | Tanaka | 398/1 |
| 2007/0268818 A1 | 11/2007 | Sugihara | 370/216 |
| 2008/0025724 A1 | 1/2008 | Ozaki | 398/68 |
| 2008/0037981 A1 | 2/2008 | Mukojima | 398/10 |
| 2010/0098407 A1 | 4/2010 | Goswami et al. | |
| 2011/0069954 A1 * | 3/2011 | Hu et al. | 398/45 |

OTHER PUBLICATIONS

Office action issued in U.S. Appl. No. 13/043,990 on Apr. 2, 2013, 13 pages.

Office action issued in U.S. Appl. No. 13/043,990 on Oct. 22, 2013, 8 pages.

* cited by examiner

*Primary Examiner* — Hanh Phan
(74) *Attorney, Agent, or Firm* — Fish & Richardson P.C.

(57) ABSTRACT

An optical communications system includes a MSAP and an optical transceiver mounted at the MSAP that communicates over an optical network to at least one optical network terminal (ONT). A first electronic module is operatively connected to the optical transceiver and configured to control the optical transceiver and mounted at the MSAP separate from the optical transceiver. A redundant second electronic module is supported within the MSAP and mounted separate from the optical transceiver. A Mux/Demux module interconnects and supports the first and second electronic modules to form an integral unit and mounted at the MSAP separate from the optical transceiver. The Mux/Demux module is configured to switch the second electronic module into communication with the optical transceiver upon failure of the first electronic module.

19 Claims, 5 Drawing Sheets

OPTICAL COMMUNICATIONS SYSTEM HAVING REDUNDANT ELECTRONIC MODULES FOR OPTICAL TRANSCEIVER

FIELD OF THE INVENTION

The present invention relates to communications systems, and more particularly, this invention relates to optical communications systems that communicate over an optical network to at least one optical network terminal (ONT).

BACKGROUND OF THE INVENTION

As the fiber footprint expands, more critical services are provided using optical access networks. Medical, academic and business services are a few examples. Standards bodies such as FSAN (Full-Service Access Network) are aware of this trend and of the resulting need to ensure a resilient, reliable and redundant network to support such critical services. FSAN notes that such issues have been largely ignored in optical access networks to date but must be addressed in the NGPON (Next Generation Passive Optical Network) standard currently under development to ensure the "resilience" of "high value services for residential and business applications." This is important given the expected high levels of service integration and high split ratios (up to 1:256) foreseen for NGPON. Business class services typically demand "five 9's" (99.999% of service availability, which equates to roughly 5 minutes of down time per year.

Unlike the core network which is based on dual, counter propagating rings to ensure duplication and redundancy at every node, the optical access network typically uses a branched topology, with a single feeder/distribution fiber feeding multiple (N) fiber drops through an optical splitter to form a 1:N network. Redundancy at every point in this type of Point to Multi-point (PtMP) access network topology is cost prohibitive and difficult to implement due to this branched topology. (It is estimated that fully redundant systems have 3.5 times the cost of equivalent systems with no redundancy.) Though full network redundancy is a difficult problem, redundancy of the more critical active components in the access network can be more easily addressed. The importance of addressing this issue becomes clear when one considers that PtMP systems such as GPON (Gigabit PON) or NG-PON can serve up to 256 customers per PtMP system. A critical component failure in the network hardware, for example, in the Central Office (CO)-based electronics, would interrupt service to the entire PtMP network.

SUMMARY OF THE INVENTION

An optical access communications system includes a MSAP (Multi-Service Access and Aggregation Platform) located at a service provider operated Central Office. An Optical Line Terminal (OLT), housed in the MSAP includes an optical transceiver that communicates over an optical network to at least one optical network terminal (ONT). A first OLT electronic module is operatively connected to the OLT optical transceiver and configured to control the OLT optical transceiver and mounted in the MSAP separate from the OLT optical transceiver. A redundant second OLT electronic module is supported within the MSAP and mounted separate from the OLT optical transceiver. A Mux/Demux (Multiplexor/Demultiplexor) module connects to the first and second OLT electronic modules and links them to the OLT optical transceiver via a high-speed link. A MSAP switch module and system controller connect to and support the first and second OLT electronic modules. The Mux/Demux module is configured to switch the second OLT electronic module into communication with the OLT optical transceiver upon failure of the first electronic module. The switch module is a network switch that directs traffic across the MSAP backplane. The Mux/Demux is a more simple device that directs traffic between the optical transceiver and either the active or standby OLT electronic module. The system controller configures and manages the MSAP. The system controller also interfaces with any remote management tools used by a service provider. It is different than the switch module and the Mux/Demux.

In one non-limiting example, an external optical shelf is positioned near the MSAP and supports the OLT optical transceiver separate from the first and second OLT electronic modules. The OLT optical transceiver is connected to the OLT electronic modules via a high speed electronic link and Mux/Demux. The MSAP switch module is configured by the system controller to provide the same transmit data and routing table information to both OLT electronic modules. The "active" OLT electronic module transmits the data through the Mux/Demux and high speed link to the OLT optical transceiver in the external optical shelf for further transmission on the PtMP network. The second OLT electronic module, the "stand-by" module, only transmits data to the OLT optical transceiver in the external optical shelf when the first OLT electronic module fails and the Mux/Demux circuit activates the transmission path from the second OLT electronic module to the OLT optical transceiver. The Mux/Demux can activate the transmission path from the stand-by OLT electronic module based on alarm signals from the OLT electronic modules, a command from the MSAP system controller, or manual intervention, for example via a manual switchover button on the front panel of the OLT electronic modules.

Both OLT electronic modules simultaneously receive and process the same data from the PtMP network via the OLT optical transceiver and Mux/Demux. However, the MSAP switch module only forwards the data from the active OLT electronic module. In another example, the MSAP includes a chassis, which has a backplane. Circuit boards support the OLT electronic modules. The OLT electronic module circuit boards plug into the MSAP backplane. The MSAP switch module and system controller circuit boards also plug into the MSAP backplane. The MSAP system controller and MSAP switch module are thereby connected to the first and second OLT electronic modules via the MSAP backplane. Another circuit board supports the Mux/Demux and interconnects to both OLT electronic modules. In yet another example, the Mux/Demux plugs into the backplane of the chassis.

In yet another example, a central office includes the MSAP chassis having a backplane. The optical shelf, supporting the OLT optical transceiver is housed within the MSAP chassis.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
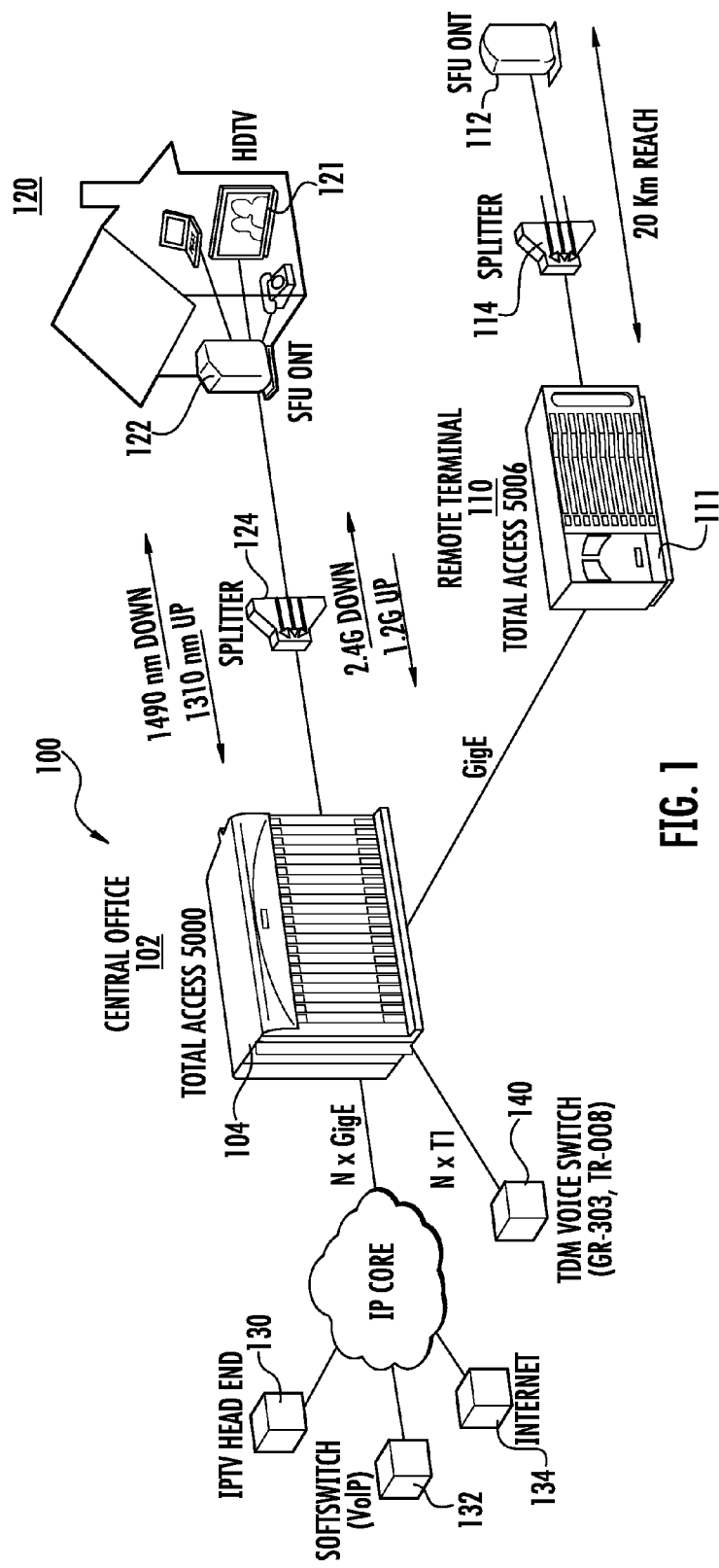
FIG. 1 is a high-level diagrammatic view of a communications network as a Passive Optical Network (PON) and showing a central office that includes a MSAP that typically includes at least one Optical Line Terminal (OLT) and connected to a home premises that includes an Optical Network Unit (ONU).

FIG. 1 is a block diagram showing a communications system 100 as a Passive Optical Network (PON) that incorporates various components that can be used in accordance with a non-limiting example, showing as an example a specific embodiment using various components such as manufactured by the assignee, ADTRAN, INC. of Huntsville, Ala. A Central Office 102 includes a MSAP (multi-service access and aggregation platform) 104 such as a Total Access 5000 platform as manufactured by ADTRAN, INC., which connects to another Remote Unit 110 having a MSAP 111, such as a Total Access 5006, which connects to a single family unit (SFU) Optical Network Unit (ONU) 112 through a splitter 114. The MSAP 104 at the Central Office 102 also connects, via a splitter 124, to a home premises 120 that includes a HDTV 121 as an example and other home devices through a single family unit (SFU) optical network unit 122. The MSAP 104 may also connect to an IPTV headend 130, a soft switch 132, and Internet 134 through an IP core 136. The MSAP 104 may also connect to a TDM voice switch 140 in a non-limiting example.

The MSAP at the Central Office 102 in this non-limiting example includes a number of OLT modules. The Optical Distribution Network (ODN) is located between the OLT and any ONU. Typically the ODN includes fibers and passive splitters as illustrated for allowing Fiber to the Premises (FTTP).

As noted before, each Passive Optical Network uses various optical transceivers, one at the optical line terminal at the Central Office and one at each of the optical network units. Each transceiver includes both transmit and receive functions, wherein the optical transceiver includes a laser driver and laser for the transmit path and a photodetector and receive path electronics for the receive path.

Optical communication systems typically have OLT electronics and OLT transceivers bunched tightly together in the same modules/chassis typically located at the central office in the MSAP platform. It has been found from actual deployments and accelerated testing that optical transceivers generally have much lower FIT (Failures in Time) statistics and longer MTBF (Mean Time Before Failure) than the electronics surrounding these transceivers in communications modules. The optical transceiver is typically the most expensive component in an optical system. The OLT module located at the Central Office in a 1:N network is usually the most critical hardware component in the network. If this module fails, all N customers connected to it lose service.

In accordance with a non-limiting example, the OLT optical transceiver in the MSAP is separated from the rest of the MSAP OLT module with its associated electronics. In one example, the OLT optical transceiver is not on the same PCB (Printed Circuit Board) as the rest of the OLT module. When a redundant OLT electronic module is provided, this separation of the optics and electronics allows failed OLT electronics to be swapped out without interrupting traffic and without incurring replacement costs for an OLT optical transceiver.

In one example, the redundant OLT electronics are connected to the OLT optical transceiver through high-speed channels and a high bandwidth Mux/Demux module. A simple protocol to switch between the redundant data streams provided by the redundant electronics in the event of a failure of the active electronics module is provided. Since the optics have a longer life time, only the electronic portion of the optical communication system is designed for redundancy. This saves the cost of duplicating the OLT transceiver and provides redundancy at the most critical point in the 1:N network.

In a non-limiting example explained in detail below, the OLT optical transceiver is separated from the first and second OLT electronic modules. The OLT optical transceiver is typically located on an external shelf or in the MSAP chassis on a separate printed circuit board module than the first and second OLT electronic modules. A Mux/Demux module switches between the first and second OLT electronic modules and in one example could plug into the back of the TA5000 chassis to connect the OLT electronic modules as shown in FIG. 2.

This Mux/Demux module is configured to allow the second OLT electronic module to receive a copy of data that is received by the first OLT electronic module when in active communication with the OLT optical transceiver. In addition both the first and second OLT electronic modules receive the same data from the MSAP switch module for distribution on the PON. The Mux/Demux module is configured to switch the second OLT electronic module into the active communication path upon failure of the first electronic module. This is possible because the second OLT electronic module receives both upstream and downstream data in real-time. The MSAP system controller provides control and housekeeping for the system.

As explained in greater detail below, the Analog Devices AD8159 has been found advantageous to use with electronic modules and provide redundancy as a digital Mux/Demux module in this non-limiting example. The AD8159 is an asynchronous, protocol agnostic, quad-lane 2:1 switch with 12 differential PECL-/CML-compatible inputs and 12 differential CML outputs and uses NRZ signaling with data rates of up to 3.2 Gbps per lane. Each lane offers two levels of input equalization and four levels of output pre-emphasis. It uses four multiplexers and four demultiplexers, one multiplexor and one demultiplexor per lane to support up to 4 channels of independent bidirectional traffic. Consequently, the AD8159 can provide redundancy for four independent transmit channels and 4 independent receive channels. A single AD8159 can act as the Mux/Demux module to provide redundancy for 4 PONs on the first OLT electronics module by multiplexing 4 channels on the first OLT electronics module with 4 channels on the second OLT electronics module as explained below in greater detail.

Figure 2:
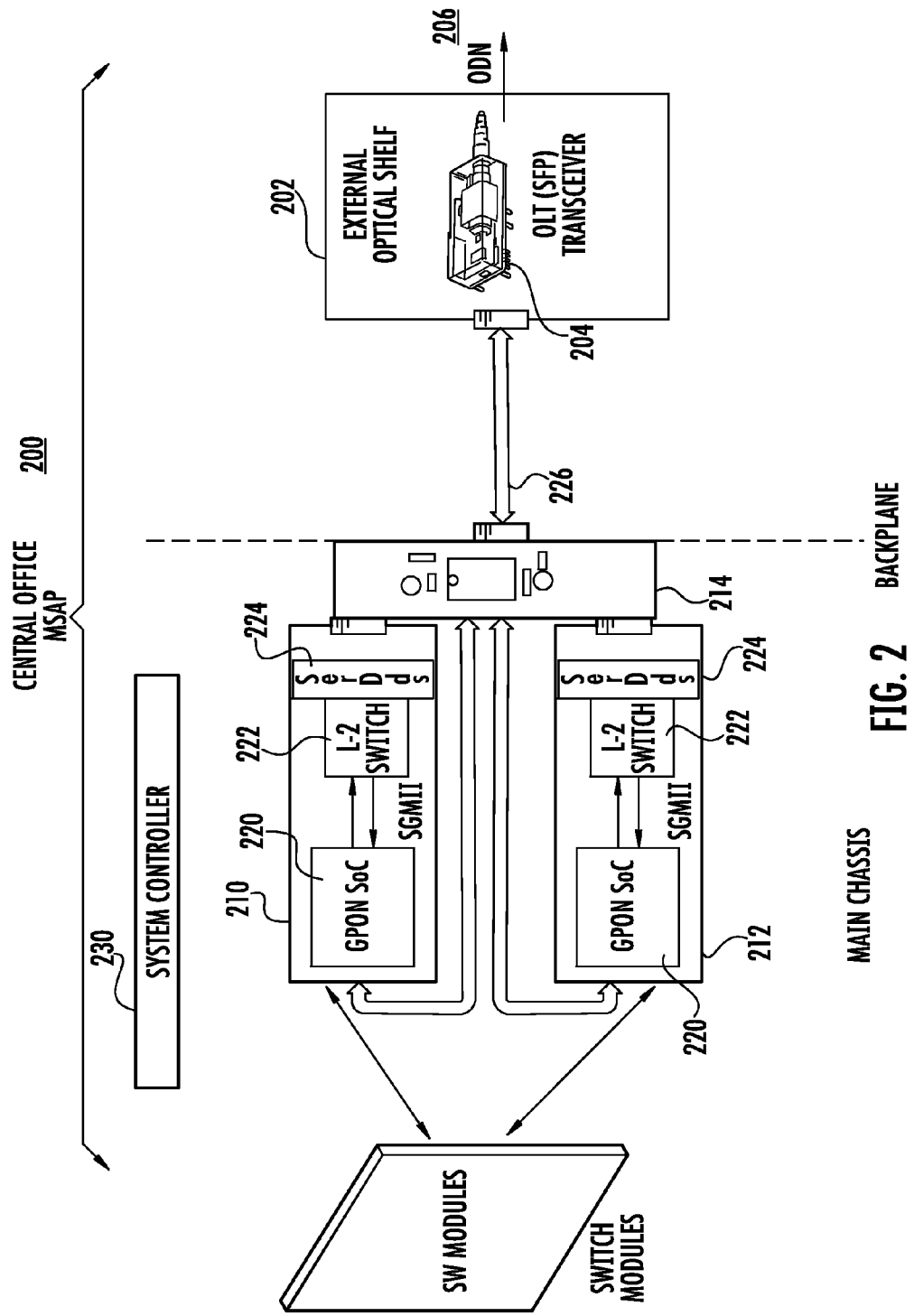
FIG. 2 is a block diagram of a portion of a MSAP platform showing an OLT optical transceiver, a first OLT electronic module, a redundant second OLT electronic module, and Mux/Demux module interconnecting the OLT electronic modules and the OLT optical transceiver in accordance with a non-limiting example.

FIG. 2 is an example MSAP platform 200 such as the TA5000. An external optical shelf 202 supports an OLT optical transceiver 204 that communicates with the optical distribution network (ODN) 206. This is correct for one redundant pair of channels on the OLT electronic modules. Each OLT electronics module, however, will support multiple PONs (2, 4, or 8) and the AD8159 can multiplex 4 pairs of PONs (one from the first OLT electronics module and one from the second OLT electronics module in each pair) to 4 independent OLT optical transceivers in the external optical shelf. The external optical shelf could support many OLT optical transceivers (24, 48, or 96, for example). First and second OLT electronic modules 210, 212 as printed circuit board cards are connected to the Mux/Demux module 214 as a printed circuit board card as illustrated. The OLT electronic modules could transmit data to and receive data from the Mux/Demux via copper cables as shown in FIG. 2 or they could transmit data to and receive data from the Mux/Demux via the PCB interconnect already present, thereby removing the need for the copper cables. The Mux/Demux module card connects into a backplane in one non-limiting example and the modules 210, 212 as cards connect into the Mux/Demux module in one example. First and second OLT electronic modules 210, 212 in this non-limiting example each includes GPON hardware, 220 an L-2 (Layer 2) switch 222 and Serdes (Serial-Deserializer) 224. Four SPF copper cables, one for each redundant pair of channels 226, connect the Mux/Demux module to the external optical shelf 202 that supports the OLT transceivers 204. The shelf typically contains more than one transceiver. In the current example, the external optical shelf must have at least four optical transceivers, one for each pair of redundant channels.

In this example, the optical shelf is a one-rack unit (1-RU) optical shelf. A MSAP switch module provides redundant data to the first and second OLT electronic modules under the direction of the MSAP system controller 230. In one example, an OLT electronic module failure is communicated to the system controller 230, which then communicates with the Mux/Demux 214 to ensure that the second OLT electronic module 212 is switched from stand-by mode to active operation and communication after the first OLT electronic module 210 is considered to fail. In another example, the Mux/Demux automatically switches the second OLT electronics module 212 from stand-by to active mode based on a simple protocol of hardware alarms triggered when the first OLT electronic module 210 fails. The MSAP system controller 230 is notified of the change to allow additional action such as setting of system alarms.

Figure 3:
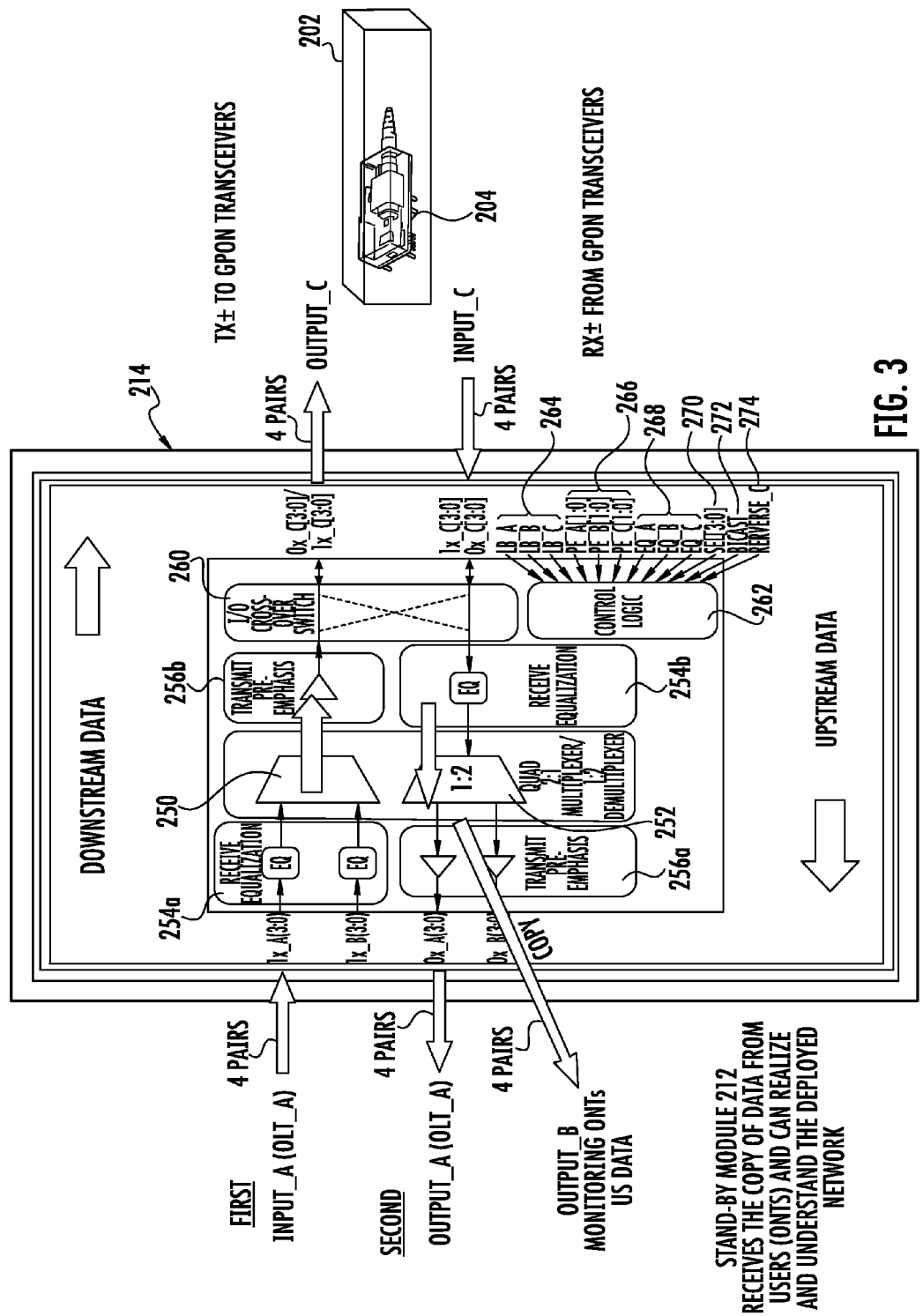
FIG. 3 is an example configuration for a Mux/Demux module that can interconnect first and second OLT electronic modules in accordance with a non-limiting example shown as A and B.

FIG. 3 is a block diagram of the Mux/Demux module 214 and is an example of components that can be used in accordance with a non-limiting example. In this example, the components include receive equalization circuits 254a, 254b which communicate respectively with a quad 2:1 multiplexer circuit 250 and a quad 1:2 demultiplexer circuit 252. The multiplexor circuit 250 and the demultiplexor circuit 252 which communicate in turn with transmit pre-emphasis circuits 256b, 256a, respectively. An input/output crossover switch 260 is connected to the transmit pre-emphasis circuit 256b and with the receive equalization circuit 254b that communicates with the demultiplexer circuit 252. Control logic 262 includes inputs for loop back control 264, output pre-emphasis control 266, input equalization control 268, port selections for input and output 270, bicast/unicast control 272, and Port C reverse capability 274. This architecture allows the AD8159 to support one-to-one OLT redundancy with each OLT having four channels. The bicast mode can be used to detect failures.

Figure 4:
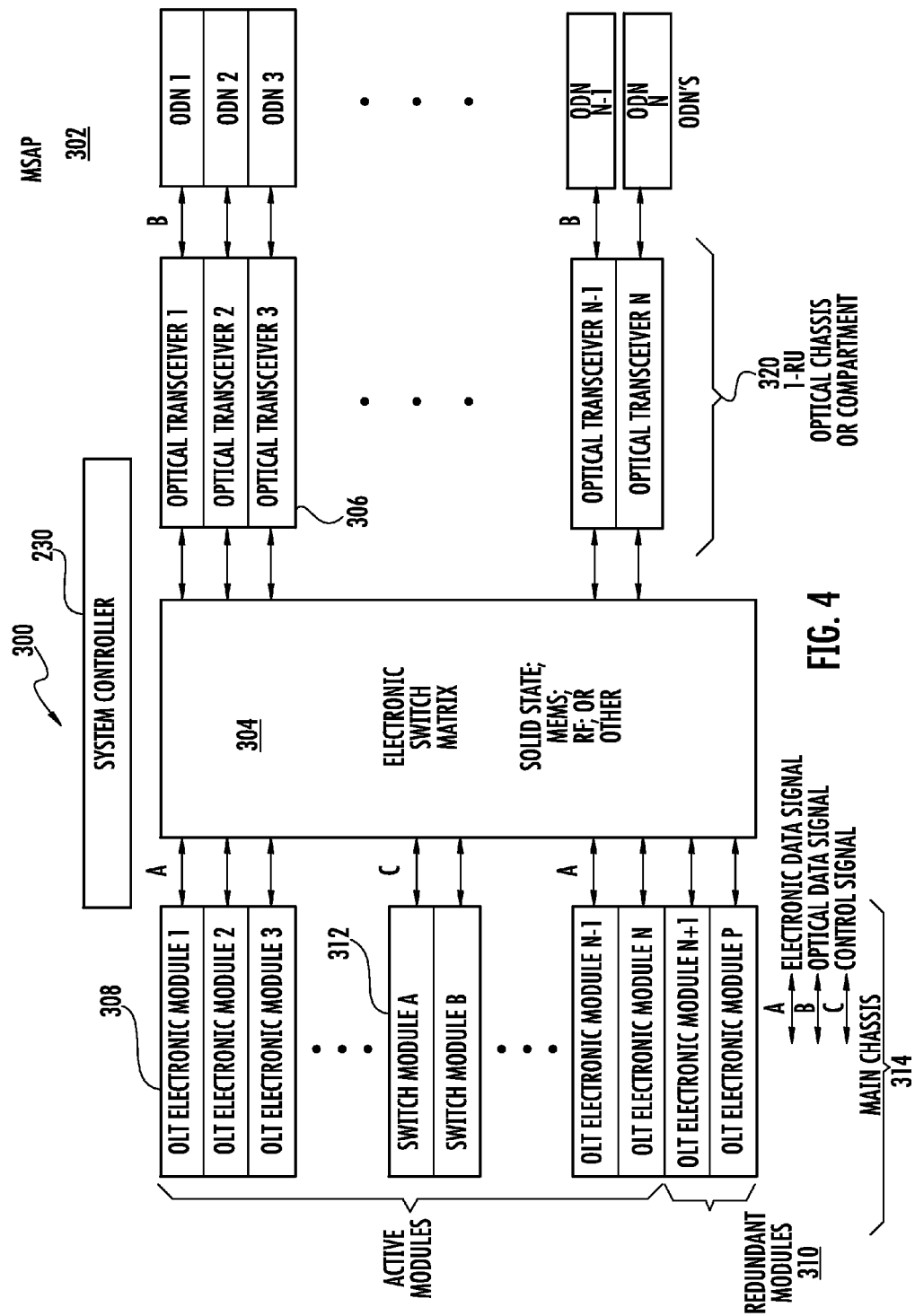
FIG. 4 is a block diagram showing an electronic switch matrix connected to OLT electronic modules and optical transceivers in accordance with a non-limiting example.

FIG. 4 is a block diagram of an optical communications system 300 such as at a MSAP 302 and showing use of an electronic switch matrix 304, a plurality of optical transceivers 306, a plurality OLT electronic modules 308, redundant switch modules 312, and a system controller 230. The MSAP switch module directs traffic throughout the MSAP. The switch modules are often redundant. (There are typically 2 in a chassis). The system controller is in charge of MSAP management. Both of these components are different from the Mux/Demux. However, in the P/N redundancy implementation, the Mux/Demux is not used. Instead, the system controller and switch module control the switch matrix as well as the electronic module.

In a preferred embodiment, N electronic modules 308 are housed in the MSAP chassis 314 for the N number of PON's 316 served by the system. P redundant/stand-by electronic modules 310 are also housed in the MSAP chassis 314, giving N+P electronic modules available to serve N customers. Typically, in this example, P=1. Any value of P, however, is acceptable provided P≤N.

N segregated optical transceivers 306 (one for each PON served by the MSAP chassis) are placed in a functionally and mechanically separate location 320, which could include a separate compartment, shelf or MSAP slot. For example, a 1-Rack Unit (1-RU) shelf above the main MSAP chassis 314 can be provided for the N segregated optical transceivers.

High-speed serial links are provided between the N+P electronic modules 308 in the main chassis and the switch matrix 304. N high-speed serial links connect the switch matrix 304 to N optical transceivers in the optical compartment 320. The electronic switch matrix 304 can be housed in the main chassis of the MSAP, in the optical compartment, or in a separate chassis. The switch matrix 304 provides cross-connect capability between the P redundant signal(s) and the N optical transceivers. If any of the N electronic modules fail, the system controller replaces the failed electronic module with one of the P redundant (stand-by) electronic modules 310 with a command to the switch matrix 304. The switch module 312 redirects traffic and routing information, under the direction of the system controller, from the failed module to the newly activated redundant module so that the redundant module assumes the functionality of the failed module.

Implementation of the cross-connect function is based on all N+P electronic modules reporting and communicating their status to the system controller 230. The system controller continuously polls the status of the N+P electronic modules for this information. Different electronic switch modules can be used in accordance with a non-limiting example. An example of the electronic switch matrix 304 includes the switches such as those manufactured by Renaissance Electronics Corporation of Harvard, Mass.

Figure 5:
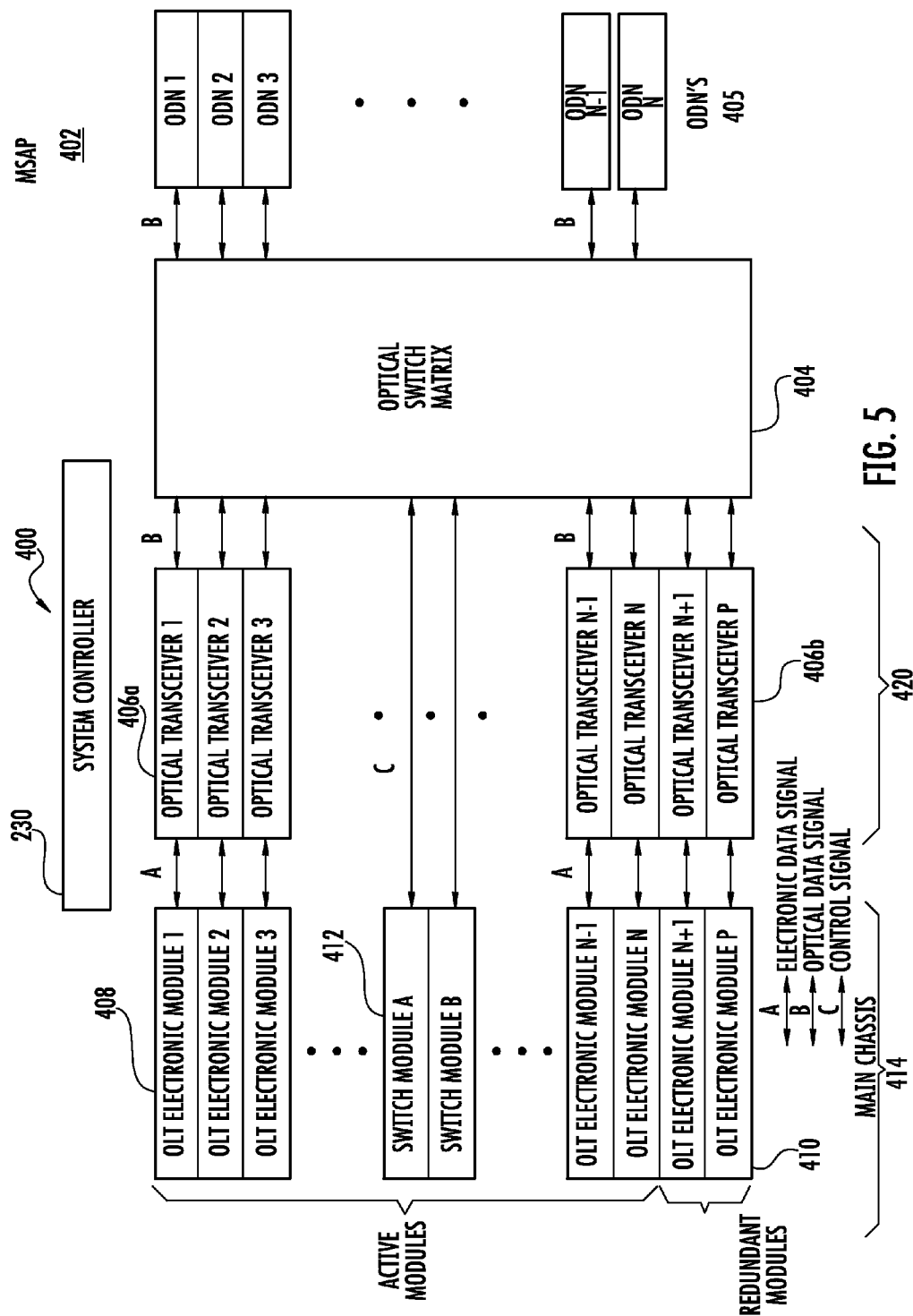
FIG. 5 is a block diagram showing an optical switch matrix that can be connected to the optical transceivers and switch modules as system controllers in accordance with a non-limiting example.

FIG. 5 is a block diagram of another optical communications system 400 as an example and showing P:N optical redundancy as compared to FIG. 4 that shows P:N electrical redundancy. In this example, similar MSAP components are used. However, the OLT electronic modules 408 and redundant electronic modules 410 are connected directly to N and P optical transceivers 406a, 406b as illustrated. In this example, the OLT optical transceivers may be housed in a dedicated location or co-located with or mounted on the OLT electronic modules. The N+P optical transceivers connect to an optical switch matrix 404. The optical switch matrix connects to the N ODN's 405 served by the system. The optical switch matrix 404 provides cross-connect capability between the P redundant OLT modules and transceivers and the N active OLT modules and transceivers. If any of the N modules fail, the system controller replaces the failed module with one of the P redundant (stand-by) modules 410 with a command to the optical switch matrix 404. The switch module 412 redirects traffic and routing information under the direction of the system controller 230 from the failed module to the newly activated redundant module so that the redundant module assumes the functionality of the failed module.

Implementation of the cross-connect function is based on all N+P modules reporting and communicating their status to the system controller 230. The system controller continuously polls the status of the N+P electronic modules for this information. Examples of optical switch matrices 404 that could be used in this embodiment include those manufactured by Glimmer Glass Networks.

The second electronic module can also receive (along with the first electronic module) a real-time copy of the transmit data from the MSAP switch module. The received data will not necessarily indicate failure of the first electronic module at least not as fast as simple hardware-based alarms/flags. There can be more than one transceiver in a real implementation. For example, with eight ports per electronic module, it could implement 1:1 redundancy on all eight ports with two electronic modules and two AD8159 Mux/Demux modules and eight optical transceivers. Some products have 24 or 48 ports per card. These could be made redundant as well with six or 12 AD8159 Mux/Demux modules and 24 or 48 transceivers in the optical shelf. The TA5000 MSAP has 20 or slots. If an assumption is made that all 20 slots are redundant, it is possible to end up using dozens of AD8159's and hundreds of transceivers implemented with the AD8159.

The system controller controls the switchover. Another valid option is to have the Mux/Demux switch automatically based on a hardware alarm indicating failure of the first electronic module. The failure and switchover is reported to the system controller for further escalation and processing. Typically, the external optical shelf is not within the MSAP chassis. The two options typically are an external shelf housing the optical transceivers or a separate PCB card for the transceivers within the MSAP.

This application is related to copending patent application entitled, "OPTICAL COMMUNICATIONS SYSTEM HAVING REDUNDANT ELECTRONIC MODULES FOR OPTICAL TRANSCEIVERS USING SWITCH MATRIX," which is filed on the same date and by the same assignee and inventors, the disclosure which is hereby incorporated by reference.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical communications system, comprising:
a MSAP (Multi-Service Access and Aggregation Platform);
an optical transceiver mounted at the MSAP that communicates over an optical network to at least one optical network terminal (ONT);
a first electronic module operatively connected to said optical transceiver and configured to control the optical transceiver and mounted at the MSAP separate from said optical transceiver;
a redundant second electronic module supported within said MSAP and mounted separate from said optical transceiver; and
a Mux/Demux module interconnecting and supporting said first and second electronic modules to form an integral unit and mounted at the MSAP separate from said optical transceiver, wherein said Mux/Demux module is configured to switch said second electronic module into communication with said optical transceiver upon failure of said first electronic module wherein said Mux/Demux module comprises a multiplexer/demultiplexer circuit and an input/output crossover switch connected to said multiplexer/demultiplexer circuit.

2. An optical communications system, comprising:
a MSAP (Multi-Service Access and Aggregation Platform);
an optical transceiver mounted at the MSAP that communicates over an optical network to at least one optical network terminal (ONT);
a first electronic module operatively connected to said optical transceiver and configured to control the optical transceiver and mounted at the MSAP separate from said optical transceiver;
a redundant second electronic module supported within said MSAP and mounted separate from said optical transceiver; and
a Mux/Demux module interconnecting and supporting said first and second electronic modules to form an integral unit and mounted at the MSAP separate from said optical transceiver, wherein said Mux/Demux module is configured to switch said second electronic module into communication with said optical transceiver upon failure of said first electronic module, wherein said Mux/Demux module is configured to allow said second electronic module to receive a copy of data that is received within the first electronic module when in active communication with said optical transceiver.

3. The optical communications system according to claim 2, wherein said second electronic module monitors data traffic through said first electronic module and is configured for deployment within the optical network.

4. The optical communications system according to claim 3, wherein said second electronic module is configured similar to the first electronic module including a knowledge of the optical network topology and a route table.

5. The optical communications system according to claim 2, and further comprising an external optical shelf or separate PCB card within said MSAP and supporting said optical transceiver separate from said first and second electronic modules and Mux/Demux module that interconnects and supports said first and second electronic modules.

6. The optical communications system according to claim 2, and further comprising a circuit board supporting at least one of said electronic modules.

7. The optical communications system according to claim 6, and further comprising a board supporting said Mux/Demux module and interconnecting and mounted to a circuit board supporting at least one of said electronic modules.

8. The optical communications system according to claim 7, and further comprising a chassis having a backplane and said Mux/Demux module plugs into the backplane of the chassis.

9. The optical communications system according to claim 2, and further comprising a system controller connected to said first and second electronic modules and Mux/Demux module configured to control said modules for switching the second electronic module into operation in place of the first electronic module.

10. The optical communications system according to claim 2, wherein said Mux/Demux module detects failure in the first electronic module and switches data communication into said second electronic module.

11. The optical communications system of claim 2, further comprising a controller configured to control the Mux/Demux to switch said second electronic module into communication with said optical transceiver upon failure of said first electronic module.

12. The optical communications system of claim 2, wherein said Mux/Demux resides in a data path between the first electronic module and redundant second electronic module and the optical transceiver, the Mux/Demux configured to selectively direct data to one of the first electronic module or redundant second electronic module based on failure of said first electronic module.

13. An optical communications system, comprising:
a central office having a MSAP (Multi-Service Access and Aggregation Platform) comprising a chassis having a backplane;
an optical transceiver at the MSAP that communicates over an optical network to at least one optical network terminal (ONT), and further comprising an external optical shelf and supporting said optical transceiver;
a first electronic module comprising a circuit board and supported within said MSAP separate from the optical transceiver and operatively connected to said optical transceiver for controlling the optical transceiver;
a redundant second electronic module comprising a circuit board and supported within said MSAP and mounted separate from said optical transceiver; and
a Mux/Demux module interconnecting said first and second electronic modules to form an integral unit mounted at the MSAP with said first and second electronic modules, said Mux/Demux module comprising a board plugged into the MSAP backplane separate from the external optical shelf and interconnecting and mounted to said circuit boards supporting said first and second electronic modules, wherein said Mux/Demux module is configured to switch said second electronic module into communication with said optical transceiver upon failure of said first electronic module, wherein said Mux/Demux module comprises a multiplexer/demultiplexer circuit and an input/output crossover switch connected to said multiplexer/demultiplexer circuit.

14. An optical communications system, comprising:
a central office having a MSAP (Multi-Service Access and Aggregation Platform) comprising a chassis having a backplane;
an optical transceiver at the MSAP that communicates over an optical network to at least one optical network terminal (ONT), and further comprising an external optical shelf and supporting said optical transceiver;
a first electronic module comprising a circuit board and supported within said MSAP separate from the optical transceiver and operatively connected to said optical transceiver for controlling the optical transceiver;
a redundant second electronic module comprising a circuit board and supported within said MSAP and mounted separate from said optical transceiver; and
a Mux/Demux module interconnecting said first and second electronic modules to form an integral unit mounted at the MSAP with said first and second electronic modules, said Mux/Demux module comprising a board plugged into the MSAP backplane separate from the external optical shelf and interconnecting and mounted to said circuit boards supporting said first and second electronic modules, wherein said Mux/Demux module is configured to switch said second electronic module into communication with said optical transceiver upon failure of said first electronic module, wherein said Mux/Demux module is configured to allow said second electronic module to receive a copy of data that is received within the first electronic module when in active communication with said optical transceiver and determine when the first electronic module has failed.

15. The optical communications system according to claim 14, wherein said second electronic module monitors data traffic through said first electronic module is configured for deployment within the optical network.

16. The optical communications system according to claim 15, wherein said second electronic module is configured similar to the first electronic module including a knowledge of the optical network topology and a route table.

17. The optical communications system according to claim 14, and further comprising a system controller connected to said first and second electronic modules and configured to control said modules for switching the second electronic module into operation in place of the first electronic module.

18. The optical communications system according to claim 14, wherein said Mux/Demux module is operative in a bicast mode to detect failure in the first electronic module and switch data operation into said second electronic module.

19. The optical communications system according to claim 14, wherein said optical shelf is formed as a one-rack unit.

* * * * *